July 4, 1961  A. F. SCHMIDT ET AL  2,991,217
METHOD FOR IMPROVING THE WETTABILITY OF
POLYETHYLENE BY AQUEOUS COMPOSITIONS
Filed Nov. 13, 1956

INVENTORS
AUGUST F. SCHMIDT
BY  PAUL J. BELKE

ATTORNEYS

United States Patent Office 2,991,217
Patented July 4, 1961

2,991,217
METHOD FOR IMPROVING THE WETTA-
BILITY OF POLYETHYLENE BY AQUEOUS
COMPOSITIONS
August F. Schmidt, Neenah, and Paul J. Belke, Wausau,
Wis., assignors, by mesne assignments, to American
Can Company, New York, N.Y., a corporation of
New Jersey
Filed Nov. 13, 1956, Ser. No. 621,871
17 Claims. (Cl. 154—139)

This invention relates to a method for improving the wettability of polyethylene by water-based adhesives and coating compositions and particularly to a method for treating the surface of polyethylene to make such surface receptive to wetting by aqueous solutions, emulsions or suspensions.

Polyethylene is a strongly hydrophobic material; that is, polyethylene is not readily wetted by water or aqueous solutions. When water or a water-based fluid material is spread on the surface of polyethylene, it is repelled by the polyethylene surface forces, and tends to draw up into separate drops by virtue of its own surface tension. This property has given rise to great difficulty in gluing polyethylene to fibrous, cellulosic sheets and other sheet materials through the use of water-based adhesives, and in coating polyethylene with aqueous emulsions or suspensions of various coating materials.

For example, in setting up or assembling cartons made of polyethylene coated paperboard, glued bonds are normally formed between the polyethylene face of certain flaps of the carton and certain areas of the paperboard backing of the carton. Such glued areas have previously exhibited low bond strength when glued with a water-based adhesive since the polyethylene is so poorly wet by the adhesive. Good bond strength may be obtained only if the adhesive adequately wets the surfaces to be joined and remains spread as a thin, even film thereon, so that the adhesive properties of the glue are operative over the entire glued area. If the adhesive film separates and the adhesive pulls up into isolated drops, the actual area which it covers is greatly reduced and the strength of a bond formed under these conditions is generally unsatisfactory.

The properties of polyethylene may be modified by a surface application of a thin coating of various materials. For example, the greaseproofness of polyethylene may be improved by a surface coating of saran, the gas permeability may be improved by a surface coating of polyvinyl alcohol and the slip characteristics may be radically altered by application of a surface film of a silicone. In applying these coatings to polyethylene from aqueous emulsions or solutions, the hydrophobic nature of the polyethylene surface has hitherto repelled the coating medium and uneven, noncontinuous coatings having little or no value have resulted. In order to achieve the desired result, the aqueous coating composition must be applied and must remain as a thin, evenly distributed layer which forms a continuous, unbroken coating film on the polyethylene surface. Coatings of this nature have not previously been obtainable on polyethylene through the use of water-based coating compositions.

Water-based adhesives and coatings are more desirable than similar solvent-based materials both from an economic standpoint and also due to the hazards involved in the necessary removal of solvents from the system after application of the adhesive or coating to the polyethylene surface.

Attempts have been made to produce a polyethylene which is receptive to water-based adhesives and coatings by oxidizing the surface of the plastic either by an oxidizing flame treatment, treatment with chemical oxidizing agents, or by oxidation by high voltage electrical discharge. The surface of polyethylene which has been treated in this manner has improved receptivity to aqueous solutions and to printing inks, but the surface oxidation results in the development of a characteristic oxidized odor which is undesirable in many applications of the plastic and is intolerable when the polyethylene is to be used for the packaging of flavor- and odor-sensitive foodstuffs.

We have now found that the surface of polyethylene may be made very receptive to aqueous adhesives and coatings without the development of undesirable odors associated with oxidation. This is accomplished by the application of a light surface dusting with a solid, powdered, hydrophilic material which adheres strongly to the surface of the polyethylene, apparently by virtue of a strong electrostatic attraction. After treatment in this manner, the polyethylene surface is readily wet by a water-based adhesive or coating which, when spread on the treated surface, remains as a thin, even film showing little or no tendency to separate into droplets or "crawl" on the polyethylene surface. When adhesives are applied to such a treated surface and a bond is subsequently formed between this surface and another surface such as paperboard or a second similarly treated polyethylene surface, the resulting bond is markedly stronger than was hitherto obtained. Thus, the practice of our invention in the lamination of polyethylene to other sheet materials by means of a water-based adhesive results in the formation of improved laminated structures. For example, excellent laminar bonds are formed between polyethylene treated according to our invention and paper or paperboard through the use of a water-based adhesive. Similarly, the process of our invention promotes the formation of overlapping or face-to-face glued joints of excellent strength by water-based adhesives used in the gluing of trays or cartons formed of polyethylene-coated paperboard.

Furthermore, water-based coating compositions will form even, continuous protective films on the surface of polyethylene treated according to the process of our invention.

The principles of our invention may be best understood from the following specification and accompanying drawing, in which.

Figure 1:
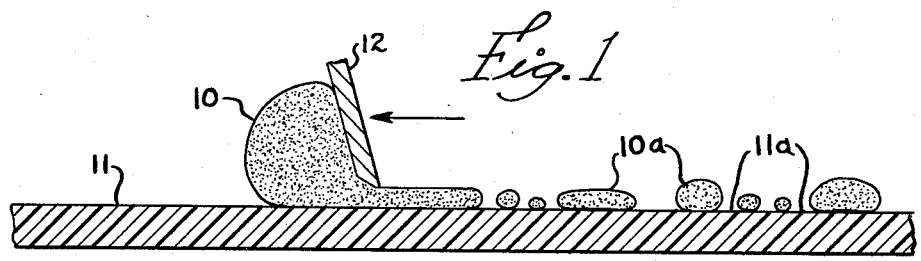
FIGURE 1 is an enlarged cross-sectional view representing a water-based adhesive being applied to an untreated polyethylene surface.

With reference to FIGURE 1, a water-based adhesive 10 is applied to the surface of a polyethylene sheet 11 by means of a doctor blade 12 or an equivalent spreading and metering device. The doctor blade applies an even coating of the adhesive which, due to the poor wettability of polyethylene, has a tendency to break up into separate, discrete droplets 10a, thereby disrupting the continuity of the adhesive film and leaving certain areas 11a of the polyethylene surface bare of adhesive.

Figure 2:
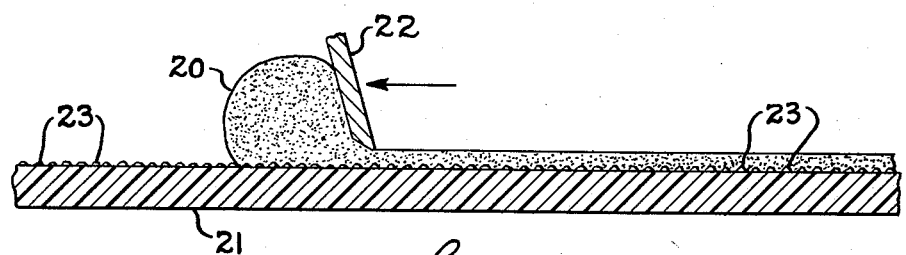
FIGURE 2 is a similar view of the adhesive application to a polyethylene surface treated according to the process of our invention.

With reference to FIGURE 2, a water-based adhesive 20 is applied to the surface of a polyethylene sheet 21 by means of a doctor blade 22. In this case, however, the polyethylene sheet had been previously treated by uniformly dusting and depositing on its surface an electrostatically adherent powder of a hydrophilic material 23 according to the process of our invention. Since the adhesive 20 readily wets the hydrophilic material 23, it does not tend to separate into droplets, but remains as an even, continuous film on the polyethylene surface.

Figure 3:
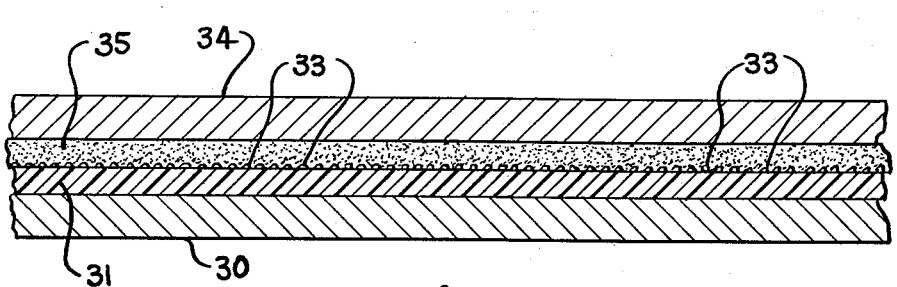
FIGURE 3 is an enlarged cross-sectional view representing a laminated structure produced in accordance with our process.

FIGURE 3 represents a laminated structure comprising a sheet material 30 having a coating of polyethylene 31, which, after being uniformly dusted with a particulate electrostatically-retained layer of a hydrophilic material 33, is adhered to a second sheet material 34 by means of a bonding layer of a water-based adhesive 35. The bond thus formed by the adhesive is improved over similar bonds previously obtainable by virtue of the increased polyethylene wettability occasioned by the presence of the solid hydrophilic material 33.

It is to be understood that the sheet materials herein mentioned may be fibrous cellulosic sheets such as paper and paperboard, or may be regenerated cellulose, metal foil or other similar sheet materials.

It is obvious that the adhesive 20 in FIGURE 2 might be substituted by a water-based coating composition designed to furnish an exterior surface coating for polyethylene rather than to serve as a laminant or adhesive for bonding polyethylene to a second sheet material.

The wettability of polyethylene by a wide variety of water-based adhesives is improved by the process of our invention. Water-based adhesives of the rubber latex, protein, polyvinyl acetate and similar types are representative. A typical formula by weight for a water-based rubber latex adhesive is as follows:

|  | Percent |
|---|---|
| Rubber latex solids | 40 |
| Casein | 12 |
| Sodium 2,4,5-trichlorophenate | 2 |
| Ammonium chloride | 1 |
| Water | 45 |

Protein adhesives may contain many different proteins, animal glue, casein and zein being represenative. A typical formula by weight for a casein adhesive is as follow:

|  | Percent |
|---|---|
| Casein | 20 |
| Calcium hydroxide | 5 |
| Sodium silicate | 14 |
| Water | 61 |

The composition of a typical polyvinyl acetate emulsion adhesive is as follows:

|  | Percent |
|---|---|
| Polyvinyl acetate | 41 |
| Dibutyl phthalate | 4 |
| Toluene | 36 |
| Oleic acid | 1 |
| Aqueous ammonia, 28% | 1 |
| Water | 17 |

Similarly, the wettability of a polyethylene surface by water-based coatings is improved by the process of our invention. Such coatings may be of the saran, polymethyl methacrylate, polybutadiene-styrene or similar types. For example, a typical saran type emulsion coating has the composition by weight:

45% of a polymer formed by co-polymerization of 85% polyvinylidine chloride and 15% acrylonitrile
0.2% morpholine oleate
54.8% water A typical polymethyl methacrylate emulsion coating has the composition by weight:

|  | Percent |
|---|---|
| Polymethylmethacrylate | 33.3 |
| Triethanol amine salt of lauryl alcohol sulfate | 0.3 |
| Water | 66.4 |

A typical butadiene-styrene co-polymer emulsion coating has the composition by weight:

33.3% of a co-polymer of 75% butadiene and 25% styrene
1.7% potassium palmitate
65% water It is to be understood that the adhesive and coating compositions cited are merely representative of a wide variety of water-based materials which exhibit improved wetting characteristics on polyethylene treated by the process of our invention. The compositions of these and similar water-based mixtures may be widely varied by alterations in the identity and ratios of the components and by the addition of various emulsifiers, stabilizers, preservatives and other modifying agents.

To be satisfactory for use in the present invention, the solid material to be dusted on the surface of the polyethylene must exhibit certain characteristics. It must be hydrophilic in nature; that is, it must be readily wet by water or by water-based adhesives or coatings. It must not dissolve readily or rapidly in an aqueous medium, however, since its effectiveness depends on the material remaining as solid particles adhering to the polyethylene surface. The material must exhibit an electrostatic attraction for polyethylene and be sufficiently finely powdered so that this electrostatic force binds or retains the particles firmly on the polyethylene surface. In general, particles not larger than about 50 microns in diameter have proven satisfactory for our use, and we prefer to use particles smaller than 10 microns in diameter.

Due to the small size of the particles used, a large surface area may be dusted with a very small amount of hydrophilic dusting material. We have found that very satisfactory results are obtained by application of less than 1 lb. of dust per ream (3,000 sq. ft.) of surface and we prefer to apply between about 0.05 lb. and about 0.25 lb. of dust on a ream of polyethylene surface. If the dust is applied in excess of the amount which may be electrostatically bound or retained on the surface, the unretained excess should be removed from the surface prior to the application of the adhesive or coating. Such unretained dust is deleterious to the bonding of the coating or adhesive to the polyethylene surface. We have found that dust in excess of about 1 lb. per ream of surface is either unnecessary or actually deleterious to the bond.

A variety of solid, finely divided materials was tested to determine the extent to which each material increased the receptivity or wettability of polyethylene to water-based adhesives and coatings.

The test was conducted by dusting about 0.25 lb. per ream of the test material on the polyethylene surface of polyethylene coated paperboard, applying about 25 lbs. per ream (dry weight) of a water-based latex type adhesive and pressing a second paperboard surface into intimate contact with the treated, adhesive-coated polyethylene surface. The bonds so formed were held under a pressure of 5 lbs. per sq. inch for 30 minutes and aged at 70° F. for 24 hours before they were tested by hand for strength of bond.

The paperboard on which polyethylene had been coated was of a type known in the industry as "white patent coated news" having a caliper of 0.018 in. and a basis weight of about 230 lbs. per ream (3,000 sq. ft.). About 10 lbs. per ream of polyethylene had been extrusion-laminated on the surface of this paperboard. The second paperboard which was pressed into contact with the adhesive-coated polyethylene surface was also white patent coated news of .018 in. caliper and a basis weight of about 230 lbs. per ream. The adhesive used in the test procedure had the composition:

|  | Percent |
|---|---|
| Rubber latex solids | 40 |
| Casein | 12 |
| Sodium 2,4,5-trichlorophenate | 2 |
| Ammonium chloride | 1 |
| Water | 45 |

The results of tests on both hydrophilic dusting materials and hydrophobic dusting materials are shown in the following Table I.

Table I

| Dusting Material | Average Particle Size in Microns | Bond Strength [1] |
|---|---|---|
| Hydrophilic Materials: | | |
| Starch | Less than 1 | Excellent. |
| Precipitated Silica | do | Do. |
| Magnesium Oxide | 12 | Do. |
| Magnesia Talc | 7 | Do. |
| Aluminum Oxide | 5 | Do. |
| Zinc Oxide | Less than 1 | Do. |
| Barium Sulfide | 2 | Do. |
| Powdered Sugar | 6 | Poor. |
| Control: No dusting | | Do. |
| Hydrophobic Materials: | | |
| Zinc Stearate | 2 | Very Poor. |
| Magnesium Stearate | 2 | Do. |
| Sublimed Sulfur | 6 | Do. |

[1] Bond Strength Rating:
Excellent—Tears fibers of paperboard upon separation of the bonded sheets.
Good—Superior to the control sample, but not a fiber tearing bond.
Poor—Failure of the bond occurs at interface between adhesive and polyethylene. Small bonded area due to poor wettability.
Very poor—Not as strong a bond as the control.

It will be noted that dusting the polyethylene surface with hydrophilic materials markedly increased the glued bond strength over that obtained on the undusted polyethylene control sample. Dusting with hydrophobic materials, on the other hand, resulted in glued bonds weaker than the control.

Dusting the polyethylene with powdered sugar (sucrose) failed to improve the glued bond since the sugar dissolved rapidly in the water-based adhesive, leaving the hydrophobic polyethylene surface bare. The adhesive then pulled up into droplets and the resulting bond had such a small interfacial area that the bond strength was no greater than that of the control.

The effect of particle size of the hydrophilic material on the glued bond strength is shown in the following Table II. The tests were conducted as previously described, using starch and aluminum hydroxide of widely different average particle size. It is evident from Table II that hydrophilic materials of small particle size are most desirable for use in our invention, since particles with a diameter greater than about 50 microns are relatively ineffective, presumably because they are not sufficiently strongly held by electrostatic force to the polyethylene surface. It will be noted that aluminum oxide with a particle size of 250 microns yields a bond with less strength than the control, while 5 micron aluminum oxide yields an excellent bond.

Table II

| Dusting Materials | Average Particle Size in Microns | Bond Strength |
|---|---|---|
| Starch | Less than 1 | Excellent. |
| Do | 40 | Good. |
| Aluminum Oxide | 5 | Excellent. |
| Do | 250 | Very Poor. |

In general, the more hyprophilic a solid dusting material is without being appreciably soluble in the water-based adhesive or coating composition, the more efficacious it has proven to be in the process of our invention. Furthermore, the smaller the particle size, the more advantageous a dusting material is for this use. It is, of course, generally desirable that the electrostatically-retained dust be of substantially uniform particle size. Starches have proven to be of particular value as dusting materials since starch is strongly hydrophilic but is not readily soluble in water. The formation of colloidal suspensions in water is not to be confused with true solubility. Starches suitable for our use may be obtained from potatoes, corn, rice, tapioca or similar materials. Starch may be modified by mild chlorination, partial enzyme conversion or by reaction to form starch hydroxyethyl ethers or similar modified starch derivatives. These modified starches are also suitable for use in our invention and are intended to be included in the term "starch."

Starch generally exhibits a very small particle size, often in the range of 1 micron or less in diameter, though materials of this nature having a particle size up to about 50 microns are also common and are suitable for our use. Photomicrographs of the glued areas obtained in the previously described tests show conclusively that dusting the polyethylene with hydrophilic materials such as starch previous to the adhesive application resulted in a greatly increased glue-polyethylene interfacial area due to the increased polyethylene wettability.

Polyethylene film, treated with starch as described above, was coated with a saran latex emulsion which, upon removal of the water contained therein, was found to form a thin, evenly distributed, continuous saran coating on the polyethylene. Without the dusting procedure of our invention, it is not possible to obtain a continuous coating of this type on polyethylene by treatment with an aqueous emulsion, due to the hydrophobic nature of polyethylene.

Our invention is also of value in increasing the wettability of polyethylene to printing inks having a hydrophilic base such as glycol or alcohol. Treatment of polyethylene according to our invention greatly reduces "crawling" of such inks printed on the surface of the polyethylene, thereby increasing the quality of the printing.

Having now described our invention in detail and presented a number of illustrative embodiments thereof, it is obvious that many modifications may be made without departing from its spirit. It is therefore to be understood that the invention is not to be limited except as defined in the appended claims.

We claim:

1. A method of providing a water-base coating composition on a polyethylene surface which consists in uniformly dusting said surface at normal temperature with a hydrophilic particulate material electrostatically attractive to said polyethylene surface, thereby providing a uniform electrostatically adhered layer of said particulate material on the surface of said polyethylene, and then applying a water-base coating composition over said particulate layer, said coating composition being uniformly spread over said particulate material.

2. A method for improving the strength of bonds formed by a water-base adhesive between two surfaces, at least one of said surfaces being polyethylene, which consists in dusting on each 3,000 sq. ft. of the surface of said polyethylene at normal temperature a maximum of about one pound of a hydrophilic material substantially insoluble in said water-base adhesive, said hydrophilic material having a relatively uniform particle size smaller than about 50 microns in average particle diameter and having an electrostatic attraction for said polyethylene and being adhered thereon by such electrostatic forces, applying said water-base adhesive to at least one of the surfaces to be adhered together and joining the two surfaces under sufficient pressure and for sufficient time to effect a firm bond therebetween.

3. A method for improving the strength of bonds formed by a water-base adhesive between two surfaces, at least one of said surfaces being polyethylene, which consists in dusting on each 3,000 sq. ft. of the surface of said polyethylene at normal temperature between about 0.05 lb. and about 0.25 lb. of solid hydrophilic material having a relatively uniform particle size smaller than about 10 microns in average particle diameter and having an electrostatic attraction for said polyethylene and being adhered thereon by electrostatic forces, applying said water-base adhesive to at least one of the surfaces to be adhered together and joining the two surfaces under sufficient pressure and for sufficient time to effect a firm bond therebetween.

4. A method for improving the wettability of polyethylene by water-base adhesive compositions and coating compositions which consists in dusting on the surface of said polyethylene at normal temperature prior to the application of any of said water-base compositions a maximum of about one pound of starch per 3,000 sq. ft. of said surface, said starch having an average particle size less than about 50 microns in diameter and being adhered on said polyethylene surface by electrostatic forces.

5. A method for improving the wettability of polyethylene by a water-base adhesive which consists in dusting on the surface of said polyethylene at normal temperature prior to the application of said adhesive between about 0.05 lb. and 0.25 lb. of starch per 3,000 sq. ft. of said surface, said starch having a relatively uniform particle size of less than about 10 microns in average particle diameter and being adhered on said polyethylene surface by electrostatic forces.

6. A method for improving the wettability of polyethylene by a water-based rubber latex adhesive which consists in dusting on the surface of said polyethylene at normal temperature prior to the application of said adhesive a maximum of about 1 lb. of starch per 3,000 sq. ft. of said surface, said starch having a relatively uniform particle size less than about 50 microns in average particle diameter and being adhered on said polyethylene surface by electrostatic forces.

7. A method for improving the wettability of polyethylene by water-base adhesive compositions and coating compositions which consists in dusting on the surface of said polyethylene at normal temperature prior to the application of any of said water-base compositions a maximum of about one pound of magnesium oxide per 3,000 sq. ft. of said surface, said magnesium oxide having a relatively uniform particle size less than about 50 microns in diameter and being adhered on said polyethylene surface by electrostatic forces.

8. A method for improving the wettability of polyethylene by water-base adhesive compositions and coating compositions which consists in dusting on the surface of said polyethylene at normal temperature prior to the application of any of said water-base compositions a maximum of about one pound of magnesia talc per 3,000 sq. ft. of said surface, said magnesia talc having a relatively uniform particle size less than about 50 microns in diameter and being adhered on said polyethylene surface by electrostatic forces.

9. A method for improving the wettability of polyethylene by water-base adhesive compositions and coating compositions which consists in dusting on the surface of said polyethylene at normal temperature prior to the application of any of said water-base compositions a maximum of about one pound of aluminum oxide per 3,000 sq. ft. of said surface, said aluminum oxide having a relatively uniform particle size less than about 50 microns in diameter and being adhered on said polyethylene surface by electrostatic forces.

10. A method for improving the wettability of polyethylene by water-base adhesive compositions and coating compositions which consists in dusting on the surface of said polyethylene at normal temperature prior to the application of any of said water-base compositions a maximum of about one pound of zinc oxide per 3,000 sq. ft. of said surface, said zinc oxide having a relatively uniform particle size less than about 50 microns in diameter and being adhered on said polyethylene surface by electrostatic forces.

11. A laminated structure comprising a base sheet having a surface coating of polyethylene, a layer of particulate hydrophilic material applied at normal temperature on the surface of said polyethylene coating and adhered thereon only by electrostatic forces, a bonding film derived from a water-based adhesive applied over said particulate layer, and a sheet material bonded to said base sheet by said bonding film.

12. A laminated structure comprising a base sheet having a surface coating of polyethylene, a layer of a maximum of about one pound of a particulate hydrophilic material of relatively uniform particle size less than about 50 microns in average diameter applied at normal temperature and substantially evenly dispersed on each 3,000 sq. ft. of surface of said polyethylene and adhered thereon only by electrostatic forces, a bounding film derived from a water-based adhesive applied over said particulate layer, and a sheet material bonded to said base sheet by said bonding film.

13. A laminated structure comprising a base sheet having a surface coating of polyethylene, a layer of a maximum of about one pound of starch per 3,000 sq. ft. of said sheet applied at normal temperature and substantially evenly distributed on the surface of said polyethylene and adhered thereon only by electrostatic forces, said starch having a relatively uniform particle size less than about 50 microns in average particle diameter, a bonding film derived from a water-based rubber latex adhesive applied over said starch layer, and a sheet material bonded to said base sheet by said bonding film.

14. A laminated structure comprising a layer of polyethylene, a layer of a maximum of about one pound of a particulate hydrophilic material of relatively uniform particle size less than about 50 microns in average diameter applied at normal temperature and substantially evenly dispersed on each 3,000 sq. ft. of surface of said polyethylene and adhered thereon only by electrostatic forces, a bonding film derived from a water-based adhesive applied over said particulate layer, and a sheet material bonded to said polyethylene by said bonding film.

15. A coated sheet material comprising polyethylene having dusted thereon at normal temperature and substantially evenly distributed on each 3,000 sq. ft. of at least one of its surfaces and adhered thereon only by electrostatic forces, a maximum of about one pound of a particulate, hydrophilic material of relatively uniform particle size less than about 50 microns in average particle diameter, and superimposed on said particulate material a continuous coating derived from a water-based coating composition.

16. A laminated structure according to claim 11 in which said base sheet and said sheet material are fibrous cellulosic sheets.

17. A laminated structure according to claim 13 in which said sheet material is a fibrous cellulosic sheet.

References Cited in the file of this patent
UNITED STATES PATENTS

| | | |
|---|---|---|
| Re. 24,062 | Horton | Sept. 20, 1955 |
| 1,516,598 | Griffiths | Nov. 25, 1924 |
| 2,303,828 | Derby | Dec. 1, 1942 |
| 2,341,885 | Sowa | Feb. 15, 1944 |
| 2,663,663 | Weltman et al. | Dec. 22, 1953 |
| 2,697,058 | Lasak | Dec. 14, 1954 |
| 2,909,443 | Wolinski | Oct. 20, 1959 |

OTHER REFERENCES

"Engineering Drawing," by French; McGraw-Hill Book Company, Inc., New York, 1918, page 278.